(No Model.)
A. F. MONTGOMERY.
ART OF COATING ELECTRIC CONDUCTORS.
No. 528,301. Patented Oct. 30, 1894.
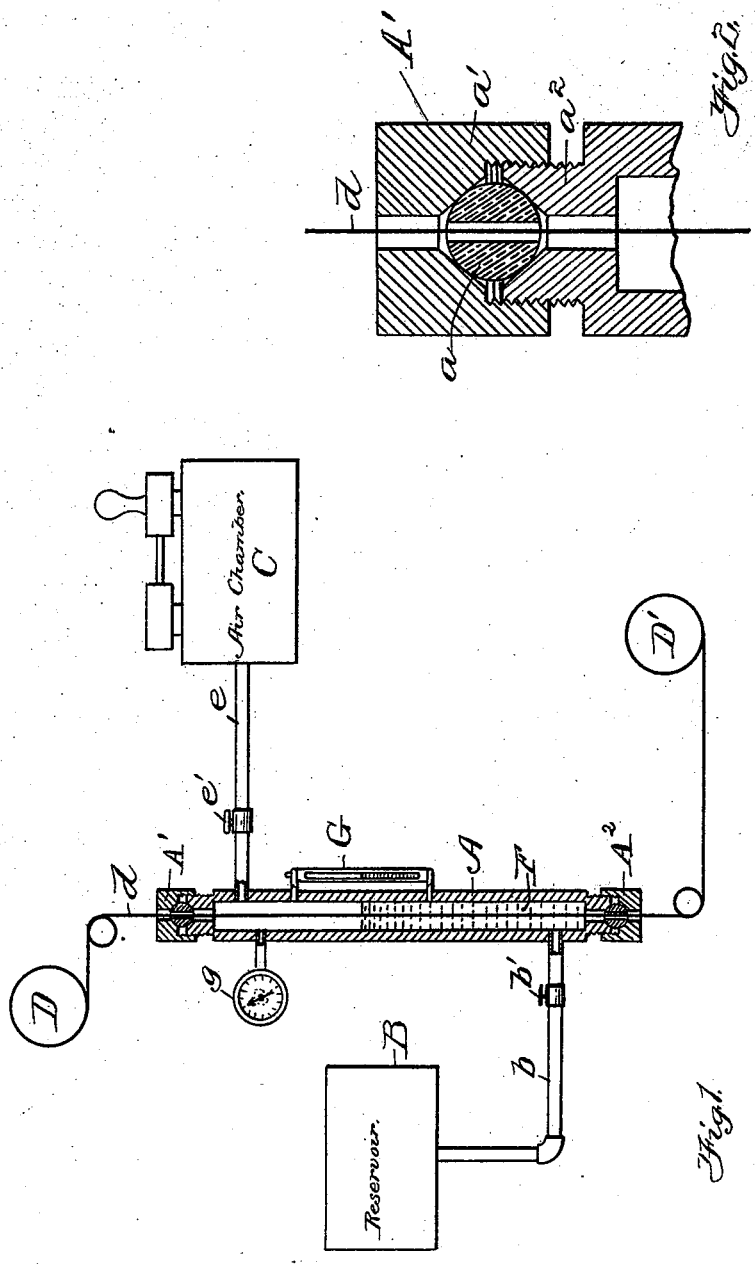

UNITED STATES PATENT OFFICE.

ALBERT FRANCIS MONTGOMERY, OF LINCOLN, RHODE ISLAND, ASSIGNOR TO LAWRENCE ABRAHAM LOCKWOOD, OF SAME PLACE.

ART OF COATING ELECTRIC CONDUCTORS.

SPECIFICATION forming part of Letters Patent No. 528,301, dated October 30, 1894.

Application filed July 2, 1894. Serial No. 516,386. (No specimens.)

*To all whom it may concern:*

Be it known that I, ALBERT FRANCIS MONTGOMERY, of Lincoln, in the county of Providence and State of Rhode Island, have invented a new and useful Improvement in the Art of Coating Electric Conductors, of which the following is a specification, reference being had to the accompanying drawings, in which—

Figure 1 is a sectional elevation of my apparatus. Fig. 2 is a detail, enlarged for clearness, of the stuffing boxes through which the wire to be coated passes into and out of the coating tank.

My invention relates to improvements in the art of coating electric conductors. The coating of electric conductors is commonly effected by covering the wire (which is the conductor commonly used) with some vegetable fiber, braided, woven or wound upon the wire, the wire thus covered being soaked in some non-conducting or fire proof material in a liquid form which afterward solidifies. Difficulty is experienced, on account of the presence of air therein, in properly filling these pores and interstices and a method of obviating this difficulty to a certain extent is known to those skilled in the art which consists in depositing a coil of wire thus covered with fibrous or porous material in a tank containing sufficient of the liquid coating to cover the wire. The air is then partially exhausted from the tank in order to assist the entry of the liquid coating into the fibrous covering of the wire. The result of this method is not satisfactory, as the liquid does not always penetrate equally well throughout the entire length of the wire. Another objection to this method is that it is not continuous, the tank being opened to permit the withdrawal of coils of wire and the introduction of other coils which are to be coated.

The object of my invention is to more evenly and better fill the interstices of a fibrous or porous covering with a liquid and to do it by a continuous process instead of by an intermittent process; and my invention consists in first passing the wire to be coated through rarefied air and immediately thereafter into the coating fluid, the wire being passed into the rarefied air through a stuffing box and out of the coating fluid through a stuffing box. In this way the operation may be made continuous and every part of the covered wire may be equally exposed to both this vacuum and the coating liquid.

My apparatus for effecting this object consists of a tank A in which liquid is kept at a proper level, the means shown in the drawings for accomplishing this being a reservoir B connected with the tank by a pipe $b$ with a stop cock $b'$. The top and bottom of the tank A have stuffing boxes $A'$ $A^2$ through which the covered wire passes into and out of the tank. A vacuum chamber C with its air pump is connected by a pipe $c$ with a stop cock $c'$ to the upper part of tank A. A gage G serves to show the height of liquid in tank A while a vacuum gage $g$ shows the attenuation of the air in the upper part of tank A. The wire $d$ to be coated, is passed from reel D through stuffing box $A'$ into tank A, the upper part of which contains only rarefied air (with the vapors arising from the liquid) and during its passage through this rarefied air the fibrous or porous covering is emptied of air. The wire then passes through the coating liquid F and out of the tank through stuffing box $A^2$ onto reel $D'$.

The enlarged section of stuffing boxes $A'$ $A^2$ shows a spherical gland $a$ of rubber or the like, under pressure from a cap $a'$ screwing upon neck $a^2$. By means of the cap $a'$ the gland may be distorted and the passage through the gland made substantially air and liquid tight.

What I claim as my invention is—

1. The above described method of coating electric conductors covered with porous material consisting in moving the covered conductor lengthwise through a vacuum chamber and through a liquid partly filling that chamber, substantially as described.

2. The apparatus above described consisting of a tank, means for supplying liquid to the tank, means for creating a vacuum in the tank above the liquid; and means for drawing the wire to be coated through the tank; all organized and operating substantially as described.

ALBERT FRANCIS MONTGOMERY.

Witnesses:
 THOMAS SIDNEY REED,
 JOHN WARREN MCKINLAY.